May 8, 1945.  R. GROETCHEN  2,375,412
BURNER STRUCTURE
Filed July 17, 1942  2 Sheets-Sheet 1
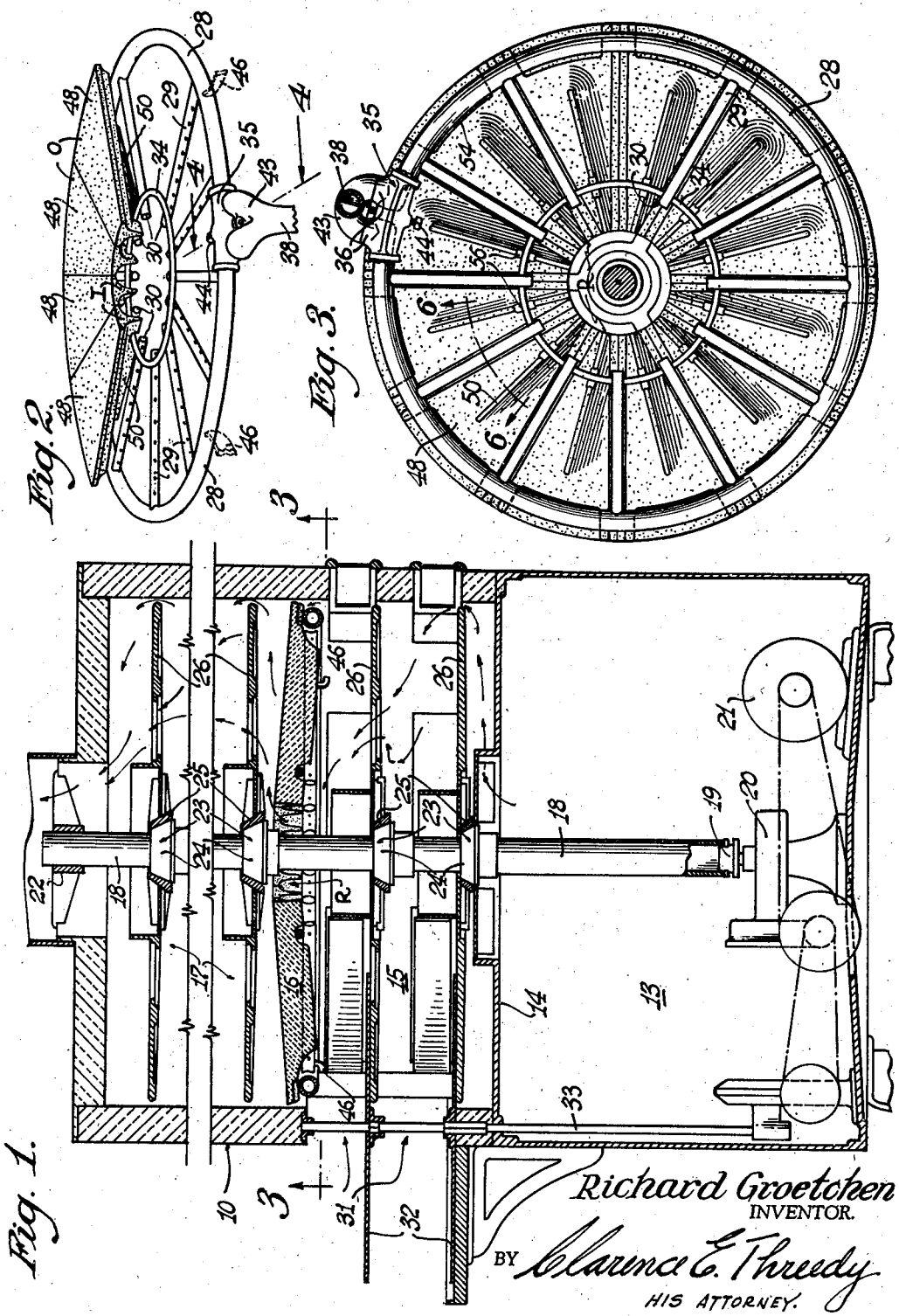
Richard Groetchen
INVENTOR.
BY Clarence E. Threedy
HIS ATTORNEY.

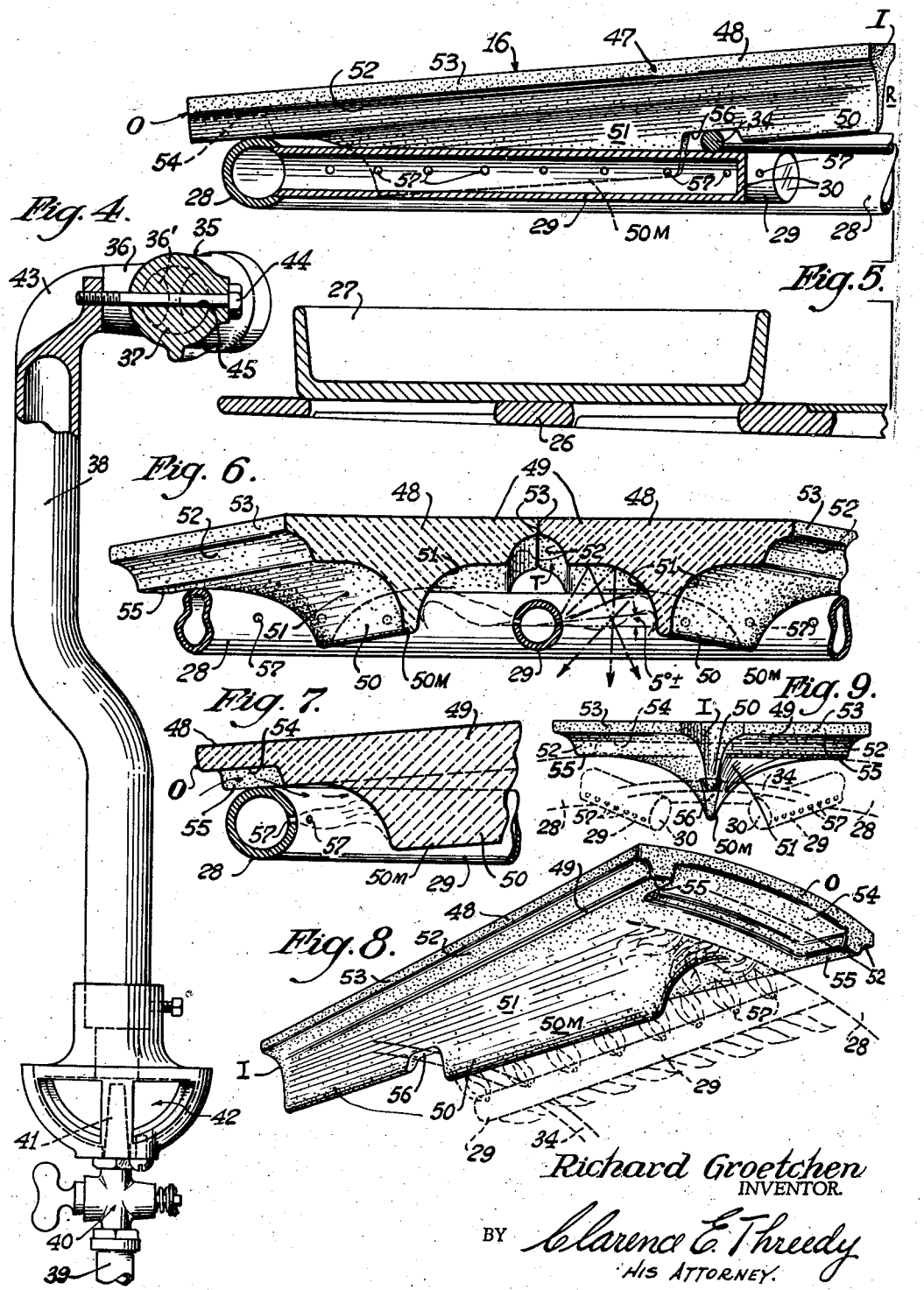

Patented May 8, 1945

2,375,412

UNITED STATES PATENT OFFICE 2,375,412

BURNER STRUCTURE

Richard Groetchen, Chicago, Ill.

Application July 17, 1942, Serial No. 451,263

6 Claims. (Cl. 158—113)

This invention relates to burners for a cooker having a broiling compartment and has as its principal object the provision of a broiler burner structure which will be simple in construction, economical in manufacture and highly efficient in use.

Another object of my invention is to provide a simple burner structure for a rotary cooker which will form a support for heat radiating ceramics forming a part of the burner structure.

A further object of my invention is to provide a burner structure having a uniform heat distribution within a circular area.

A still further object of this invention is to provide a heat radiant element in a burner structure formed to reflect heat downward upon edibles to be broiled and to provide an oxygen passage to the burners from the perimeter thereof to the center.

Other advantages and novel aspects of my invention are found in certain details of construction and will become more apparent in the light of the description in view of the drawings in which:

Fig. 1 is a vertical sectional view through a rotary cooker showing my new burner structure;

Fig. 2 is a perspective view of my new burner structure with certain radiant elements thereof removed;

Fig. 3 is a bottom plan view of the burner assembly as seen looking upward at line 3—3 in Fig. 1;

Fig. 4 is an enlarged detail view, partly in section, of the fuel gas supply line showing its connection with the burner;

Fig. 5 is a fragmentary vertical sectional detail showing one radial element of the burner structure and its relative position with respect to the rotary food bearing tray of the cooker;

Fig. 6 is a vertical sectional detail in cross section through one radial element of the burner as seen along line 6—6 in Fig. 3;

Fig. 7 is an enlarged fragmentary vertical section through the outer periphery of the burner and along a point midway between radial elements thereof substantially as shown in Fig. 1;

Fig. 8 is a perspective view looking up at the underside of one radiant element and illustrating the burner frame in phantom; and Fig. 9 is an end elevational view of a radiant element such as is shown in Fig. 8 looking from its smaller end toward its larger end.

The present invention is shown embodied in a rotary cooker having a housing 10 of cylindrical form and divided into three main sections. The cooker structure shown forms the basis of the pending application, Serial No. 407,748, filed by Sidney Dawson on August 21, 1941, and will only be referred to in so far as is necessary to a full understanding of the burner structure of this present application.

The housing 10 includes a utility chamber 13 having a top wall 14 comprising the bottom wall of a broiler chamber 15 within which the burner structure indicated at 16 is disposed, said burner structure providing a baffle which separates the broiler chamber from the upper part of the housing 10 to provide a preheating chamber or oven 17.

A vertical shaft 18 is suitably arranged coaxially within the housing 10 on a drive means 19 including a gear reduction unit 20 driven by an electric motor 21. The upper end of the shaft 18 is centrally supported by a bearing 22 so that the shaft may rotate within the housing. There is arranged on the shaft 18 a plurality of friction couplings 23 comprising a cone 24 with a complementary member 25 having an internal cone adapted to bear upon the cone 24 and including radially extending arms which support a grille plate 26 for rotation within the housing 10. Two of such grille plates 26 are disposed within the broiler chamber 15 while a plurality of them are arranged equidistant from each other in the preheating chamber 17, each of such grilles forming a support for casseroles, one of which is shown at 27 (Fig. 5) and within which is adapted to be disposed the edible to be cooked.

The burner 16 comprises an annular tubular ring 28 having extending inwardly therefrom a plurality of radially disposed fuel conduits 29 each of which has its inner end sealed as at 30 a substantial distance from the center of the ring 28. These conduits 29 are spaced equidistant from each other, in the present instance there being a 30° angle between them with the exception of one pair which is spaced 60° apart by reason of such pair being normally disposed adjacent an opening 31 in the casing where the casseroles 27 are ejected by an ejector disc means 32 driven by an auxiliary shaft 33 having driving connection with the motor 21. The inner ends of the conduits 29 are tied together by an internal ring 34 which overlies each of the conduits 29 and is spot-welded to the latter to reinforce them.

The tubular ring is most economically made by bending a piece of pipe into ring form, although it is obvious that a casting in this form will equally serve the purpose. The two open ends of the tubular ring are joined by a fitting 35 which is formed to align with the arc of the ring.

This fitting is provided with a pair of laterally extending flanges 36 to provide a pair of entrances 36' to the tubular ring 28, which entrances are divided from each other by a central web 37 so that fuel gas is directed circumferentially around the tubular ring. A fuel feed throat 38 (Fig. 4) is adapted to receive fuel gas from a main supply line 39. The fuel supply is controlled by a valve 40 for passage through a Venturi tube 41 into a mixing chamber 42 and thence along the throat 38, the head 43 of which is split to provide a dividing line for the fuel passage whereby fuel gas is supplied equally to the two entrances 36'.

The ring 28 is disposed within the housing 10, as seen in Fig. 1, upon inwardly extending brackets 46 carried on the inner wall of the housing.

The throat 38 is affixed to the fitting 35 by means of a bolt 44 which extends through a bore 45 in the fitting and has its end threaded and screwed into a tapped opening on the head 43.

The burner structure is completed by the provision of a heat reflecting cover 47. This cover is made up of a plurality of segmental plates 48 each of which is made out of a ceramic such as refractory cement, fire clay or other heat resisting material. The efficiency of the present burner structure is greatly increased by reason of the contour, reflective qualities and the arrangement of these segments with respect to the ring 28 and conduits 29, and will now be explained in detail.

As will be noted in Figs. 2 and 3, the segments are formed to correspond in dimension to the segmental space provided between each of the radially extending conduits 29, there being one of such segments placed over each such space with the abutting edges of the segments disposed above the adjacent conduit 29. Referring now to Figs. 5 to 9 inclusive, each plate 48 includes a main body 49 having depending therefrom a central web 50. This web 50 has a cove formation 51 which gradually increased in radius from its inner end I, that is, the end nearest the center of the housing, and toward its outer end O; and as seen in Fig. 9 the under side of the plate 48 with respect to the web 50 at the inner end I has the contour of a parabolic curve having its long axis disposed to the vertical, which contour gradually flows into a parabolic curve having its long axis disposed to the horizontal at the outer end of the web 50. The purpose of this graduated contour from inner toward outer end of the plate will be more fully understood when the operation of the burner structure is explained hereinafter. The plate 48 is further provided with a quarter round cove 52 on the lower side of its abutting edge 53 and has its outer edge O recessed as at 54, the purpose of which cove and recess will also become more apparent when the operation of the burner is explained hereinafter. The mid portion 50M of the web 50 is disposed to extend downwardly between the adjacent radially extending conduits 29, the web being recessed as at 56 to provide a seat adapted to rest upon the internal ring 34. The plates 48 are placed in position with the margins 55 of the recess 54 resting upon the tubular ring 28 and the recess 56 on the internal ring 34, the arrangement being such that each plate 48 is pitched with respect to the horizontal from the perimeter of the ring 28 wth an inclination toward the center of the housing.

The tubular ring 28 and the radially disposed conduits 29 are each provided with ports 57 through which fuel gas already mixed with air will emit for purpose of combustion. These ports 57 are all formed above the horizontal axis of the members 28 and 29 and as seen in Figs. 6 and 7 are preferably disposed at an angle of 5° above such horizontal axis. The ports 57 formed in the tubular ring 28 are disposed to direct fuel gas inwardly or toward the center of the housing, one of which ports is directly opposite the outer edge of the web 50 (Fig. 7), with others spaced therefrom to direct fuel gas along the contoured side walls of the web. The ports 57 on the conduit 29 are formed closer to each other adjacent the ring 28, which spacing is gradually increased as they approach the center of the housing because the inner ends of the conduits 29 are closer together at the center of the housing as is apparent in Fig. 3, and therefore less flame is required in the central region. To this end the ports closest the inner end of the conduits are smaller in diameter because the length of the flame is decreased in proportion to the diminution of the distance to the web 50. It will be noted in the particular burner shown that no ports are required in the area above the ejector opening 31 and hence none are shown.

*Operation*

Upon ignition of the fuel gas emitting from the ports 57, a flame will be produced as seen in dotted lines, Figs. 6 to 8 inclusive. Preliminary to cooking, these flames must heat up the broiler chamber 15 to the desired temperature, preferably from 800° to 850° F. When the burner is first lit, the flame is the usual normal spear-like flame which extends slightly upwardly toward the cove 51 on the plate 48. As the heat from these flames strikes the webs 50, these webs become heated until they attain a glowing heat such as is produced by burning embers of coal. As a result of this glowing heat, the fuel gas emitting from the ports 57 is rendered combustible to a greater efficiency, the flame expanding over against the web 50 with the luminous envelope of the flame playing upon the curved wall of the web. By reason of such extended flame, the fuel gas pocket within the luminous envelope expands by reaching out toward the glowing webs 50, and wtih additional oxygen supplied by air rising from the utility chamber as shown in Fig. 1 more combustible gases are produced, thus rendering the entire under side of the heat reflecting cover 47 aglow with a blue flame.

As before explained, the segmental plates 48 each are pitched from the inner to outer edges, thus creating a natural draft in the opposite direction to permit escape of fumes and heat at the center restricted opening R provided by the abutting ends I of the plates 48. The quarter round coves 52 of adjacent plates 48 provide a trough T which extends from the perimeter of the burner toward the opening R, thus supplying fresh air to the region above each of the radially disposed conduits 29, and assuring a sufficient supply of oxygen for each of the flames emitting from the ports 57 therein. The ports 57 on the inner edge of the tubular ring 28 are supplied with fresh air through the by-pass provided by the recess 54 in the outer edge O of the plates 48, thus assuring a sufficient supply of oxygen to the flame as they increase in size as hereinbefore explained.

The heat created by the combined action of the flame and under side of the heat reflecting cover 47 is deflected downwardly as shown by the dot-dash arrowed lines (Fig. 6) onto the casserole 27 supported therebeneath. Thus, the foodstuff contained within the casserole is broiled by the effect of such reflected heat which penetrates through the food in the time it takes the rotary grille 26 to travel approximately one revolution.

It will be noted that the heat created by the burner 16 is uniform throughout the radii of the grille by reason of the graduated volume of flame together with the graduated curvature of the coves 51 on the webs 50, thus assuring that the entire object being cooked will be uniformly penetrated by heat near the perimeter of the grille 26 as well as adjacent the center area thereof.

While I have illustrated and described the preferred form of construction for carrying my invention into effect, this is capable of variation and modification without departing from the spirit of the invention. I, therefore, do not wish to be limited to the precise details of construction set forth, but desire to avail myself to such variations and modifications as come within the scope of the appended claims.

Having thus described my invention, what I claim as new and desire to protect by Letters Patent is:

1. In a burner structure comprising, in combination, a framework having an annular tubular ring having a plurality of ports formed therein, a plurality of radially disposed conduits communicating with said tubular ring and having ports formed therein, an internal ring connected to the inner ends of said conduits, a heat deflecting plate arranged on said framework, said plate resting upon said annular tubular ring adjacent the outer end and upon said internal ring at the inner end and disposed at an inclination from outer to inner end to create a natural draft in the direction of said inclination above said framework, and a fuel supply line connected to said annular tubular ring to supply fuel gas for emission at said ports 2. In a burner structure comprising, in combination, a burner frame having an annular tubular ring with a plurality of radially disposed conduits extending inwardly therefrom, said conduits being spaced equidistant from each other to provide intervening segmental spaces, a plurality of perforations formed in said ring and conduits along the inner marginal edges defining the segmental spaces, an annular bail disposed coaxially with respect to said ring and having connection with the inner end of each of said conduits, a heat deflecting cover for said burner frame and comprising a plurality of segmental ceramic plates, said plates having a cove formed at the juncture of their bottom and abutting edges, said plates being disposed on said burner frame with one plate arranged above each of said segmental spaces, said plates having their outer end resting on said ring and their inner end disposed on said bail to dispose said plates at an inclination toward the center, the inner ends of said plates providing a restricted central opening above said burner frame and the cove of abutting edges of said plates disposed above a corresponding conduit and forming an inverted trough from the perimeter to the central opening of said burner structure whereby to create a natural draft toward said opening, and a fuel line having communication with said ring to supply fuel gas to said perforations.

3. In a burner structure comprising, in combination, a burner frame having an annular tubular ring with a plurality of radially disposed conduits extending inwardly therefrom, said conduits being spaced equidistant from each other to provide intervening segmental spaces, a plurality of perforations formed in said ring and conduits along the inner marginal edges defining the segmental spaces, an annular bail disposed coaxially with respect to said ring and having connection with the inner end of each of said conduits, a heat deflecting cover for said burner frame and comprising a plurality of segmental heat resisting plates, each of said plates having a depending web along its center, said plates being disposed on said burner frame with one plate arranged above each of said segmental spaces with said web disposed between said conduits and adapted to reflect heat produced by a flame emitting from said perforations, said web having a notched formation arranged on said bail to dispose the plates in pitched relation with respect to said ring and conduits to create a draft from perimeter to center of said burner, and a fuel conductor communicating with said tubular ring to supply fuel gas to said perforations whereby said fuel gas may become ignited to produce a flame.

4. In a burner structure comprising, in combination, a burner frame having an annular tubular ring with a plurality of radially disposed conduits extending inwardly therefrom, said conduits being spaced equidistant from each other to provide intervening segmental spaces, a plurality of perforations formed in said ring and conduits along the inner marginal edges defining the segmental spaces, an annular bail disposed coaxially with respect to said ring and having connection with the inner end of each of said conduits, a ceramic baffle for said burner and comprising a plurality of segmental plates, each of said plates having a web portion extending therefrom and providing a curved surface on each side of said web, said curved surface graduating in diameter from the small end of said plate toward the outer end thereof, said plates being arranged on said burner frame with its web portion disposed between adjacent conduits and adapted to reflect heat produced by the flame of ignited fuel gas emitting from said perforations, and a fuel supply conductor having communication with said tubular ring to supply fuel gas to said perforations for combustion into a flame.

5. In a burner structure comprising, in combination, a burner frame having an annular tubular ring with a plurality of radially disposed conduits extending inwardly therefrom, said conduits being spaced equidistant from each other to provide intervening segmental spaces, a plurality of perforations formed in said ring and conduits along the inner marginal edges defining the segmental spaces, an annular bail disposed coaxially with respect to said ring and having connection with the inner end of each of said conduits, a ceramic baffle for said burner and comprising a plurality of segmental plates foreshortened at their inner ends to provide a restricted opening, each of said plates having a web portion extending therefrom and providing a curved surface on each side of said web, said curved surface graduating in diameter from the small end of said plate toward the outer end thereof, said plates having a cove formation at the juncture of their bottom wall and abutting edges, said plates being arranged on said burner frame with its web portion disposed between adjacent conduits and adapted to reflect heat produced by the flame of ignited fuel gas emitting from said perforations, and a fuel supply conductor having communication with said tubular ring to supply fuel gas to said perforations for combustion into a flame, said cove formations being disposed above said conduits and providing an air supply trough from the perimeter of said burner toward said restricted opening to supply oxygen to the region above said perforations.

6. A burner unit comprising a supporting structure including a conduit, perforated conduits leading from and communicating with said first-mentioned conduit, a bail supported on the outer ends of the perforated conduits, a heat radiating unit arranged upon said supporting structure with its outer edge portion resting on said first-named conduit and having at its inner edge a notch adapted to receive said bail and having portions disposed in the path of a flame adapted to emit from said perforated conduits, and a fuel supply conduit communicating with said first-named conduit.

RICHARD GROETCHEN.